United States Patent
Higashikawa

(10) Patent No.: US 11,084,309 B2
(45) Date of Patent: Aug. 10, 2021

(54) DECORATIVE MATERIAL

(71) Applicant: TOPPAN PRINTING CO., LTD., Tokyo (JP)

(72) Inventor: Eiichi Higashikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/905,093

(22) Filed: Jun. 18, 2020

(65) Prior Publication Data

US 2020/0316977 A1 Oct. 8, 2020

Related U.S. Application Data

(63) Continuation of application No. PCT/JP2018/046972, filed on Dec. 20, 2018.

(30) Foreign Application Priority Data

Jan. 5, 2018 (JP) .............................. JP2018-000703

(51) Int. Cl.
*B41M 5/50* (2006.01)
*B32B 1/00* (2006.01)
*B32B 33/00* (2006.01)

(52) U.S. Cl.
CPC .............. *B41M 5/502* (2013.01); *B32B 1/00* (2013.01); *B32B 33/00* (2013.01)

(58) Field of Classification Search
CPC .................................. B32B 1/00; B32B 33/00
USPC ....................................................... 428/201
See application file for complete search history.

(56) References Cited

U.S. PATENT DOCUMENTS

| 2012/0133077 A1* | 5/2012 | Mizawa | B29C 33/56 264/293 |
| 2014/0050928 A1* | 2/2014 | Gebauer | B05D 7/53 428/446 |
| 2015/0050457 A1* | 2/2015 | Fukaya | B28B 1/30 428/141 |

(Continued)

FOREIGN PATENT DOCUMENTS

| JP | 2001315286 A * 11/2000 | ............... B05D 5/00 |
| JP | 3629964 B2 | 3/2005 |

(Continued)

OTHER PUBLICATIONS

Yagishita et al., JP2001315286 (A) English Machine Translation. (Year: 2001).*

(Continued)

*Primary Examiner* — Betelhem Shewareged
(74) *Attorney, Agent, or Firm* — Foley & Lardner LLP

(57) ABSTRACT

A decorative material includes a first gloss control layer provided as a surface layer and a second gloss control layer provided on part of the first gloss control layer. The first gloss control layer contains a gloss control agent comprised of a hydrophobic inorganic material and a silicone-based release agent having a reactive terminal group. The reactive terminal group of the silicone-based release agent preferably has at least one of a hydroxyl group and an amino group. Preferably, the second gloss control layer contains a silicone-based release agent having a reactive terminal group, and the reactive terminal group of the silicone-based release agent has at least one of an acryloyl group and a methacryloyl group.

11 Claims, 1 Drawing Sheet

(56) References Cited

U.S. PATENT DOCUMENTS

2020/0316977 A1\* 10/2020 Higashikawa ......... B41M 5/502

FOREIGN PATENT DOCUMENTS

| JP | 2013-244696 A | 12/2013 |
| JP | 2016-068483 A | 5/2016 |
| JP | 2016-221745 A | 12/2016 |
| WO | WO-2017/204361 A1 | 11/2017 |
| WO | WO-2019/013197 A1 | 1/2019 |

OTHER PUBLICATIONS

International Searching Authority, "International Search Report," issued in connection with International Patent Application No. PCT/JP2018/046972, dated Apr. 2, 2019.

International Searching Authority, "Written Opinion," issued in connection with International Patent Application No. PCT/JP2018/046972, dated Apr. 2, 2019.

\* cited by examiner

DECORATIVE MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/046972, filed on Dec. 20, 2018, which is based upon and claims the benefit of priority to Japanese Patent Application No. 2018-000703, filed on Jan. 5, 2018, the disclosures of which are all incorporated herein by reference in their entireties.

BACKGROUND

Technical Field

The present invention relates to a decorative material for use in interior and exterior finishes of buildings, and surface decoration of fittings, furniture, and the like. More specifically, the present invention relates to a decorative material that three-dimensionally expresses unevenness due to a difference in surface gloss.

Background Art

Conventionally, desired design patterns, such as wood grain patterns and stone grain patterns, have generally been applied to decorative materials for use in, for example, interior and exterior finishes of buildings, and surface decoration of fittings, furniture, and the like. Moreover, decorative materials that not only two-dimensionally express design patterns, such as wood grain patterns and grain patterns, but also three-dimensionally express the feeling of unevenness of the surface of natural wood materials or stone materials, have also been widely used mainly for applications for which a high-grade feeling is desired.

As a method for expressing a feeling of three-dimensional unevenness together with a two-dimensional design pattern on the surface of decorative materials, various methods have been conventionally proposed, and separately used depending on the purpose. In particular, there is a method of visually expressing three-dimensional unevenness by taking advantage of optical illusions by changing the surface gloss state (specifically, glossiness) of portions to be expressed as recesses or projections, rather than actually forming unevenness on the surface of the decorative material. According to this method, even if there is actually no unevenness, the human eye recognizes portions with higher gloss as projections, and portions with lower gloss as recesses.

Specifically, for example, a transparent or translucent synthetic coating layer with low gloss is formed across the surface of a base material on which patterns, including a concave pattern, are suitably printed. Then, a transparent or translucent synthetic coating layer with high gloss is formed on parts of the surface of the formed synthetic coating layer, except on parts corresponding to the concave pattern. Of course, a decorative material in which the unevenness relationship is reversed can be obtained by reversing the height relationship of the gloss.

This method can easily impart a three-dimensionally textured appearance to any base material by only preparing two coating materials that have different gloss, without requiring special chemicals or the like. In addition, this method enables formation of synthetic coating layers with different gloss by a known printing method, such as gravure printing, following formation of a design pattern (patterned ink layer). Thus, this method requires no special facilities, enhances productivity, and easily achieves matching with the design pattern. Moreover, since the thickness of each synthetic coating layer can be made much smaller than the required apparent height difference of unevenness, use of resins can be reduced and there is an advantage of flexibility. Thus, a decorative material having high suitability for bending can be easily realized. In addition, there is another advantage of preventing contaminants from remaining in the concavities because there is no large unevenness on the surface of the decorative material.

In consideration of these many advantages, decorative materials using this method have already been frequently used, but in terms of high-grade feeling, there are no methods better than those that actually form unevenness. The reason for this is considered to be as follows. For example, a mechanical embossing method can faithfully reproduce unevenness, such as natural wood vessels, including the cross-sectional shape of the vessels and the like. In contrast, this method of using two coating materials with different gloss provides two levels of gloss to the surface. Accordingly, two levels of unevenness can be expressed. Therefore, there is a problem that it is difficult to express unevenness having an inclined portion with continuously varying depth (height), such as natural wood vessels.

In light of the above, there have recently been proposals for decorative materials that can express unevenness, such as natural wood vessels, by providing a synthetic coating material layer that expresses unevenness by forming an inclined portion with continuously varying depth (hereinafter also referred to as a "gloss control layer") (see, for example, PTL 1).

Here, as a general method for adjusting the gloss of the gloss control layer, a gloss control agent (a matting agent) is added to a transparent resin, which is used as a binder. As the gloss control agent, fine particles of an inorganic or organic material are mainly used. In particular, fine particles of an inorganic material, such as fine particles of silica, have high matting performance and are widely used. Addition of such a gloss control agent can impart unevenness to the surface of the gloss control layer and this unevenness scatters light to thereby present a matting effect. By selecting a gloss control agent and controlling the added amount thereof, the required gloss can be created as desired.

As the transparent resin serving as a binder, a urethane-based resin containing at least one polyol and at least one isocyanate is often used from the perspective of processability, price, cohesive force of the resin, and the like. Urethane-based resins are characterized in that their characteristics can be variously controlled by combining polyols and isocyanates. However, since polyols and isocyanates each have a relatively large molecular weight and have a small number of functional groups per molecule, it is generally difficult to increase crosslinking density. Crosslinking density is a parameter having a particularly great influence on scratch resistance. Therefore, it is theoretically difficult for urethane-based resins to satisfy high scratch resistance, including the scratch resistance required of horizontal surfaces such as of top boards or shelf boards of furniture.

Further, in the case of a gloss control layer using the above matting agent, projections on the surface may be selectively scraped or the gloss control agent may be desorbed during a scratch resistance test. Therefore, scratch resistance may be evaluated to be poorer. Since the tendency of deterioration of scratch resistance is substantially proportional to the added amount of the gloss control agent, it may be very difficult for a decorative material having lower gloss and higher level design to satisfy the scratch resistance required of the horizontal surfaces mentioned above.

In contrast, an ionizing radiation curable resin having an acryloyl group or a methacryloyl group, which serves as a transparent resin, has a relatively low molecular weight and has a large number of functional groups per molecule. Therefore, this resin has high crosslinking density and is likely to improve scratch resistance. When such an ionizing radiation curable resin is used as a transparent resin, a decorative material having improved or even high scratch resistance can be provided. The scratch resistance of a decorative material mainly depends on the strength of the uppermost surface. Therefore, an ionizing radiation curable resin may be used only for the constituent material of the uppermost surface layer.

However, when two gloss control layers are used and the uppermost gloss control layer covers only part of the decorative material instead of entirely covering the surface, the gloss control layer located right beneath and covering the entire surface of the decorative material may have a surface which is partially exposed. Therefore, in order for a decorative material to have improved or even high scratch resistance, the transparent resins of both the gloss control layers may preferably be ionizing radiation curable resins. Also, in this case, the upper gloss control layer is laminated so as to cover part of the lower gloss control layer, which covers the entire surface of the decorative material. However, ionizing radiation curable resins are not cured unless they are irradiated with ionizing radiation. Therefore, in the process of producing a decorative material using a printer in general, the partially covering upper gloss control layer is unavoidably laminated on the uncured lower gloss control layer, which covers the entire surface of the decorative material. This may cause defects due to the gloss control layer covering the entire surface becoming dissolved or scraped.

Further, the required characteristics of decorative materials include, in addition to scratch resistance as mentioned above, a general durability with everyday use in mind. In particular, because decorative materials are mainly used for the decorative parts of furniture and the like, which are required to provide visual effects, contamination resistance is an important required characteristic. In the case of ready-to-assemble furniture, stickers indicating the order of assembly may be attached to the furniture when packed. These stickers may be detached during or after assembly. It is important in this case that the decorative materials of the furniture are imparted with release properties so as not to cause detachment. In order to impart contamination resistance and release properties to a decorative material, it is effective to use a method of adding a release agent to a gloss control layer forming a surface of the decorative material.

Here, the contamination resistance is determined by attaching various contaminant materials to the surface of a decorative material and wiping off the materials after a certain period of time using water or alcohol, followed by evaluation of the presence or extent of any residual contaminant materials, or changes in color of the decorative material caused by the contaminant materials. Therefore, in order to exhibit improved or even high contamination resistance, "preventing contaminant materials from becoming fixed on the surface of the decorative material", "preventing permeation of contaminant materials into the decorative material", and "preventing contaminant materials from causing chemical changes at the surface of the decorative material" must each be achieved. A poor evaluation in terms of overall contamination resistance will result if even one of these is inadequate.

As mentioned above, the gloss control layer is mainly composed of a transparent resin and a matting agent. However, as described above, a matting agent generally uses silica fine particles. Further, because the interaction between silica fine particles and the transparent resin is very weak, very small voids are thought to exist at the interface of the particles. Moreover, the contaminant materials to be evaluated with everyday use in mind include hydrophilic substances such as water-based ink, and such hydrophilic contaminant materials are easily adsorbed on the surface of silica fine particles, which are similarly hydrophilic. Therefore, as described above, addition of a release agent for providing contamination resistance is effective in "preventing contaminant materials from becoming fixed on the surface of the decorative material". However, this results in a poor result in terms of "preventing permeation of contaminant materials into the decorative material". As a result, when silica fine particles are used as a matting agent, the contamination resistance with respect to hydrophilic contaminant materials is reduced. The reduction in the contamination resistance caused by silica fine particles described above depends on the mixing ratio of the silica fine particles. In the case of a decorative material in which a second gloss control layer, being an upper gloss control layer, is laminated on part of a first gloss control layer, being a lower gloss control layer, the contamination resistance of the first gloss control layer having lower gloss has a tendency to decrease. Therefore, in order to ensure the contamination resistance of the decorative material as a whole, measures are necessary that focus on the first gloss control layer.

CITATION LIST

Patent Literature

[PTL 1] JP 3629964 B

SUMMARY OF THE INVENTION

Technical Problem

In order to solve the problems described above, the present invention aims to provide a decorative material having improved or even high scratch resistance, improved or even excellent release properties, and improved or even high contamination resistance, with visual effects being imparted by lamination of an upper gloss control layer on part of a lower gloss control layer.

Solution to Problem

The inventor of the present invention has performed a variety of research and experimentation to optimize the surface treatment and treatment amount of a matting agent, combinations with a silicone-based release agent having an optimal reactive terminal group, and further, applying dual curing to the resin compositions of gloss control layers by combining an ionizing radiation curable resin with a urethane-based resin, that is to say, obtaining preferable combinations of the resins. This has brought about a decorative material having improved or even high scratch resistance and that exhibits contamination resistance.

In order to achieve the object, a decorative material according to an aspect of the present invention includes: a first gloss control layer provided as a surface layer; and a second gloss control layer provided on part of the first gloss control layer; wherein the first gloss control layer includes a gloss control agent composed of a hydrophobic inorganic material and a silicone-based release agent having a reactive terminal group, and the hydrophobic inorganic material is an inorganic material that satisfies the following formula (1), where MA represents a decrease in a mass of the inorganic material and is measured using an Evaluation Method A below, and MB represents a decrease in a mass of the inorganic material and is measured using an Evaluation Method B below, with the mass of the inorganic material in the Evaluation Method A and the mass of the inorganic material in the Evaluation Method B being the same as each other $$1.2<(MB/MA)<10.0 \qquad (1)$$

Evaluation Method A

The inorganic material is left standing under a 110° C. environment for 2 hours, and then a decrease in the mass of the inorganic material is measured.

Evaluation Method B

Using the same conditions as evaluation method A except for the environment temperature, the inorganic material is left standing under a 950° C. environment for 2 hours, and then a decrease in the mass of the inorganic material is measured.

Here, the hydrophobic inorganic material refers to an inorganic material having hydrophobic surfaces. A typical hydrophobic inorganic material may be silica or the like that has been subjected to surface treatment or surface modification, that is to say, having surfaces which have been subjected to hydrophobic treatment with an organic compound.

Advantageous Effects of the Invention

According to an aspect of the present invention, a decorative material that provides visual effects, while having improved or even high scratch resistance, improved or even excellent release properties, and improved or even high contamination resistance, can be provided by selecting a gloss control agent to be added to a first gloss control layer, being a lower gloss control layer serving as a base, and using a silicone-based release agent having a reactive terminal group.

DETAILED DESCRIPTION

Hereinafter, an embodiment of the present invention will be described with reference to the drawings.

The drawings are schematic, and the relationship between the thickness and the horizontal dimension, the thickness ratio between each layer, and the like differ from actual values. The embodiments described below are merely examples of configurations for embodying the technical idea of the present invention, and the technical idea of the present invention does not limit the materials, shapes, structures, and the like of the components to those described below. The present invention is not limited to the following representative embodiments, and appropriate modifications can be made without departing from the spirit of the present invention. The representative embodiments described below are merely examples of the present invention, and the design thereof could be appropriately changed by one skilled in the art. The technical idea of the present invention can be modified in various ways within the technical scope specified by the claims.

Configuration

Figure 1:
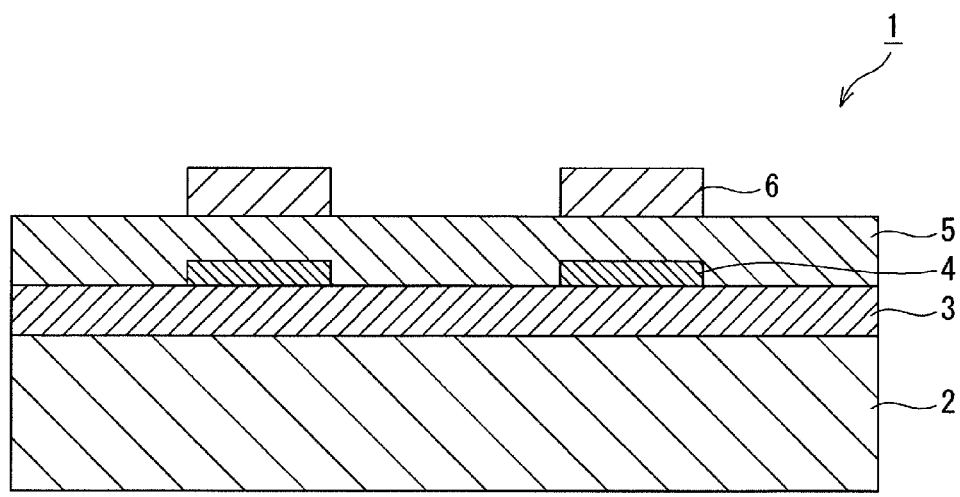
FIG. 1 is a cross-sectional view of a decorative material according to an embodiment of the present invention.

A decorative material 1 according to the present embodiment includes gloss control layers provided as surface layers. As shown in FIG. 1, the gloss control layers include a lower first gloss control layer 5 as a base, and a second gloss control layer 6 which is provided on part of the first gloss control layer 5 to improve visual effects.

The decorative material 1 may be configured to include other known layers, such as a base solid ink layer 3, a patterned ink layer 4 and a transparent resin layer (not shown), between a base material 2 and the first gloss control layer 5.

<Gloss Control Layers>

The first gloss control layer 5 is provided on the base solid ink layer 3 and the patterned ink layer 4 to control the gloss of the surface of the decorative material 1. The first gloss control layer 5 is formed on the entire front surface (upper surface in FIG. 1) of the base solid ink layer 3 and the patterned ink layer 4, and covers the entire front surface of the base material 2. Furthermore, the second gloss control layer 6, which has a gloss different from that of the first gloss control layer 5, is provided on the first gloss control layer 5 to control the gloss of the surface of the decorative material 1. The second gloss control layer 6 is formed on part of a surface of the first gloss control layer 5. The difference in gloss between the first and second gloss control layers 5 and 6 contributes to expressing an uneven configuration and improving visual effects.

The first and second gloss control layers 5 and 6 may each preferably have a thickness of 1 μm or more and 15 μm or less. Moreover, the first and second gloss control layers 5 and 6 are layers on the outermost surface of the decorative material 1, and are thus required to have surface physical properties, such as abrasion resistance, scratch resistance, solvent resistance, and contamination resistance, which are required for the decorative material 1. Of these properties, abrasion resistance and scratch resistance are affected by the layer thickness. A thicker layer is more advantageous. Therefore, the first and second gloss control layers 5 and 6 may each more preferably have a thickness of 2 μm or more and 12 μm or less. If the thickness is less than 1 μm, abrasion resistance and scratch resistance are significantly reduced, and usage as a decorative material 1 may be limited. Furthermore, if the thickness is more than 15 μm, flexibility of the first and second gloss control layers 5 and 6 is reduced, and the processability as a decorative material 1 may be reduced.

The first and second gloss control layers 5 and 6 each contain at least a resin material, and a gloss control agent and a release agent added to the resin material. The gloss control agent may be added only to the first gloss control layer 5 having lower gloss.

[Resin Component]

The resin materials respectively forming the first and second gloss control layers 5 and 6 may preferably have transparency such that the lower layer is visible.

The transparent resin used for the first gloss control layer 5 may preferably contain a main material which is a mixture of a two-part urethane-based thermosetting resin composed of various polyols and isocyanates, and an ionizing radiation curable resin having an acryloyl group or a methacryloyl group. In this case, the content of the thermosetting resin is preferably 3 parts by mass or more and 100 parts by mass or less, and more preferably 10 parts by mass or more and 50 parts by mass or less relative to 100 parts by mass of the ionizing radiation curable resin. In such a configuration, the ionizing radiation curable resin forming the resin component can be cured by applying ionizing radiation after production of the decorative material 1, and the scratch resistance of the first gloss control layer 5 can be improved. Furthermore, because the amount of the urethane-based thermosetting resin is set to 10 parts by mass or more and 50 parts by mass or less relative to 100 parts by mass of the ionizing radiation curable resin, avoidance of defects during lamination of the second gloss control layer 6, and scratch resistance of the first gloss control layer 5 can be both achieved at an improved or even high level.

If the content of the thermosetting resin is less than 3 parts by mass, defects may occur when the second gloss control layer 6 is laminated due to the first gloss control layer 5 becoming dissolved or scraped. If the content of the thermosetting resin exceeds 100 parts by mass, the extent of crosslinking in the resin composition is reduced, and scratch resistance of the first gloss control layer 5 is significantly reduced.

Thus, the decorative material 1 of the present embodiment can exhibit improved or even high scratch resistance, while minimizing defects that occur during lamination.

Here, the main material in the present specification refers to a resin material in which the content is 90 parts by mass or more, or preferably 97 parts by mass or more, relative to 100 parts by mass of the entire resin component included in the target layer.

Furthermore, the main material of the resin component included in the second gloss control layer 6 is preferably a mixture of a urethane-based thermosetting resin comprising a polyol and an isocyanate, and an ionizing radiation curable resin having an acryloyl group or a methacryloyl group. In this case, the content of the urethane-based thermosetting resin is preferably 25 parts by mass or less relative to 100 parts by mass of the ionizing radiation curable resin.

If the addition ratio of the urethane-based thermosetting resin exceeds 25 parts by mass, the ratio of the urethane-based thermosetting resin is too high. Therefore, the degree of crosslinking in the resin composition decreases, and the scratch resistance of the second gloss control layer 6 is significantly reduced. If the addition ratio of the urethane-based thermosetting resin is less than 3 parts by mass, no practical problems occur in terms of the scratch resistance. However, the decorative material 1 is required to have workability (cracking prevention), and there is a concern that this required characteristic may not be obtained. Furthermore, because the content of the urethane-based thermosetting resin in the second gloss control layer 6 is 25 parts by mass or less, when ionizing radiation is applied after production of the decorative material 1, the ionizing radiation curable resin included in the resin component can be sufficiently cured, and the scratch resistance of the second gloss control layer 6 can be improved.

The main material of the resin component included in the second gloss control layer 6 may be an ionizing radiation curable resin having an acryloyl group or a methacryloyl group. In this case, the resin component included in the second gloss control layer 6 is preferably only an ionizing radiation curable resin having an acryloyl group or a methacryloyl group.

Here, the ionizing radiation curable resin having an acryloyl group or a methacryloyl group described above may be a known material including various monomers and commercially available oligomers. However, for example, it is preferable to use polyfunctional monomers such as pentaerythritol triacrylate (PET3A), pentaerythritol tetraacrylate (PET4A), trimethylolpropane triacrylate (TMPTA) and dipentaerythritol hexaacrylate (DPHA), polyfunctional oligomers such as Shikoh UV-1700B (manufactured by Nippon Synthetic Chemical Industry Co., Ltd. (currently Mitsubishi Chemical Corporation)), or mixtures thereof.

For example, the isocyanate of the urethane-based thermosetting resin composed of a polyol and an isocyanate described above may be a curing agent such as adducts, biurets, or isocyanurate, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), methylhexane diisocyanate (HTDI), bis(isocyanatomethyl)cyclohexane (HXDI), trimethylhexamethylene diisocyanate (TMDI), or the like. For example, the polyol may be an acrylic polyol, polycarbonate polyol, polyester polyol, or the like.

As the ionizing radiation curable resin having an acrylate group or a methacrylate group forming the first and second gloss control layers 5 and 6, a polyfunctional (meth)acrylate monomer or oligomer having a number average molecular weight of 300 or more and 5,000 or less, and a functional group number or average functional group number of 4 or more and 15 or less may be preferably used. Within this range, the degree of crosslinking of the resin component in the gloss control layers can be sufficiently increased. Therefore, an improved or even high scratch resistance can be exhibited. It is more preferable to use a polyfunctional (meth)acrylate monomer having a number average molecular weight of 300 or more and 1,500 or less, and a functional group number or average functional group number of 4 or more and 8 or less. Within this range, the viscosity of the ionizing radiation curable resin can be lowered. Therefore, when an ink for forming a gloss control layer is prepared, the solids concentration can be increased at this low viscosity, so that the stability or coating state of the ink can be improved. Examples of the polyfunctional (meth)acrylate monomer include pentaerythritol tetra(meth)acrylate (PET4A) and modifications thereof, ditrimethylolpropane tetra(meth)acrylate and modifications thereof, dipentaerythritol penta(meth)acrylate (DPPA) and modifications thereof, and dipentaerythritol hexa(meth)acrylate (DPHA) and modifications thereof.

The method for measuring the number average molecular weight of the ionizing radiation curable resin is not limited. However, gel permeation chromatography (GPC) is preferably used. Although the measurement device is not limited, the filler of the GPC column is preferably a polystyrene gel, and tetrahydrofuran (THF) is preferably used as an eluent. Furthermore, a commercially available standard polystyrene polymer may be used as a GPC standard substance. Because the above polyfunctional (meth)acrylate monomer is constituted as a single substance, the number average molecular weight may be a value determined from the structural formula when the structure is known.

[Gloss Control Agent]

In the present embodiment, fine particles of an inorganic material having a hydrophobic surface (hydrophobic inorganic material) are used as a gloss control agent to be added to at least the first gloss control layer 5.

For example, the hydrophobic inorganic material may be a known inorganic material which has been subjected to surface treatment or surface modification, that is to say, having a surface which has been subjected to hydrophobization treatment by an organic compound. Examples of the gloss control agent capable of constituting such a hydrophobic inorganic material include fine particles of inorganic materials, such as silica, glass, alumina, calcium carbonate or barium sulfate. The surface of an inorganic material becomes hydrophobic when subjected to surface treatment or surface modification because the hydroxyl groups present on the surface during the production of the inorganic material become substantially eliminated or covered. As a result, it is possible to suppress the adsorption of hydrophilic contaminants and permeation into the voids existing at the interface between the transparent resin and the matting agent. Therefore, an improved or even high contamination resistance can be exhibited.

The hydrophobic inorganic material is preferably subjected to surface treatment or surface modification with an organic compound. As a benchmark to determine whether the inorganic material used as the gloss control agent has sufficiently been subjected to surface treatment or surface modification, for example, it is preferable to use an inorganic material that, in the evaluation methods A and B described below, satisfies the expression "1.2<(mass reduction MB in evaluation method B)/(mass reduction MA in evaluation method A)<10.0". Here, when calculating the above ratio, the mass of the inorganic material (gloss control agent) is set to the same mass when being evaluated by the two evaluation methods A and B.

Evaluation Method A (Heat Loss Evaluation)

A gloss control agent is heated to 110° C. and the mass decrease is measured. The water adsorbed on the surface of the gloss control agent is predominantly desorbed, which results in a corresponding mass decrease. On the other hand, when the inorganic material has been subjected to surface treatment, the treatment component is not desorbed or volatilized at 110° C. Therefore, the numerical difference that depends on whether surface treatment has been performed becomes the same value, as long as the material for the gloss control agent is the same. However, since the amount of adsorbed water depends on the method of producing the gloss control agent, this value varies between gloss control agents.

The specific method of measurement is based on, for example, JIS K5101,23; the gloss control agent is left standing under a 110° C. environment for a sufficiently long time (e.g., 2 hours) and then the mass decrease is measured.

Evaluation Method B (Ignition Loss Evaluation)

A gloss control agent is heated to 950° C. and the mass decrease is measured. The organic substances treated (adhered) to the surface of the gloss control agent are desorbed from the gloss control agent by heating up to 950° C. Therefore, if the temperature is maintained at 950° C., the mass decrease of a gloss control agent subjected to surface treatment is larger than that of a gloss control agent that has not been subjected to surface treatment. This difference indicates the amount of surface treatment.

The specific method of measurement is based on the same conditions as evaluation method A, except for the environment temperature. Specifically, the gloss control agent is left standing under a 950° C. environment for a sufficiently long time (e.g., 2 hours) and then the mass decrease is measured.

Then, if the inorganic material satisfies "1.2<(MB/MA) <10.0", a surface treatment or surface modification suitable for achieving the effects of the present embodiment is considered to have been performed. If (MB/MA) is greater than 1.2, it is presumed that the surface of the inorganic material used as the gloss control agent is hydrophobic, such that the hydroxyl groups have been eliminated or covered. Furthermore, if (MB/MA) is 10.0 or more, there is a possibility that the organic compound used for the surface treatment or surface modification is present in excess. In the case of an excess, the scratch resistance and the long-term release properties can be adversely affected as a result of the excess organic compound bleeding out during ink preparation by mixing with a transparent resin, and during film formation.

If a gloss control agent is also added to the second gloss control layer 6, the gloss control agent is also preferably a hydrophobic inorganic material. However, a commercially available known gloss control agent or the like may be used. For example, fine particles of an inorganic material, such as silica, glass, alumina, calcium carbonate or barium sulfate, may be used as in the gloss control agent added to the first gloss control layer 5. Alternatively, fine particles of an organic material composed of an acrylic material or the like may be used. However, if high transparency is required, fine particles of silica, glass, an acrylic material, or the like may preferably be used. In particular, among fine particles of silica, glass or the like, a gloss control agent with a low bulk density, in which fine primary particles undergo secondary aggregation rather than forming solid spherical particles, has a higher matting effect relative to the addition amount. As a result, use of such a gloss control agent enables the addition amount of the gloss control agent to be reduced.

The gloss control agent may have an arbitrarily selected particle size, but is preferably 2 μm or more and 15 μm or less. The particle size is more preferably 4 μm or more and 12 μm or less. If the particle size of the gloss control agent is less than 2 μm, the matting effect is poor, and the textured appearance due to the difference in gloss is not sufficiently obtained. Furthermore, if the particle size of the gloss control agent is larger than 15 μm, light scattering may be strong. This may cause cloudiness in the first gloss control layer 5 or the second gloss control layer 6, whichever contains the gloss control agent, or increase visibility of particles. Consequently, the textured appearance due to the difference in gloss may be lost.

[Release Agent]

Because the decorative material 1 of the present embodiment is required to have an improved or even high contamination resistance and stable release properties over a long period of time, it is important to add a silicone-based release agent having a reactive terminal group to the first gloss control layer 5. It should be noted that silicone-based release agents are also used as lubricants.

In particular, it is preferable to add a silicone-based release agent having either or both of a hydroxyl group and an amino group as a reactive terminal group. In this case, in terms of the structure of the silicone skeleton, a reactive terminal group may be appropriately selected in light of the required contamination resistance and the miscibility or the like when used as a coating agent by being mixed with a resin and a solvent, and further, the structure is not particularly limited. Since a urethane-based thermosetting resin is used as a resin forming the first gloss control layer 5, the hydroxyl group or the amino group is incorporated into the resin skeleton during the urethane curing reaction. Thus, long-lasting stable contamination resistance and release properties can be exhibited.

The added amount of the silicone-based release agent having a hydroxyl group or an amino group is preferably 1 part by mass or more and 6 parts by mass or less as an active component of the silicone-based release agent relative to 100 parts by mass of the entire solids included in the first gloss control layer 5. If the added amount is less than 1 part by mass, it may be difficult to exhibit the required contamination resistance and release properties, and if it exceeds 6 parts by mass, a part of the silicone-based release agent may not be incorporated into the resin skeleton, and long-lasting contamination resistance and release properties are not necessarily stably exhibited.

The release agent to be added to the second gloss control layer 6 may also preferably be a silicone-based release agent having a reactive terminal group. It is important that the silicone-based release agent has either or both of an acryloyl group and a methacryloyl group as a reactive terminal group. In a similar fashion to the first gloss control layer 5, the type of the silicone skeleton is not particularly limited. The added amount of the silicone-based release agent having either or both of an acryloyl group and a methacryloyl group is preferably 0.5 parts by mass or more and 5 parts by mass or less as an active component of the silicone-based release agent relative to 100 parts by mass of the total solids included in the second gloss control layer 6. If the added amount is less than 0.5 parts by mass, it may be difficult to exhibit the required contamination resistance and release properties, and if it exceeds 5 parts by mass, a part of the silicone-based release agent may not be incorporated into the resin skeleton, and long-lasting contamination resistance and release properties are not necessarily stably exhibited.

The added amount of the gloss control agent is preferably 5 parts by mass or more and 40 parts by mass or less relative to 100 parts by mass of the resin composition. More preferably, the added amount of the gloss control agent is 10 parts by mass or more and 30 parts by mass or less. If the added amount is less than 5 parts by mass, the matting effect may be insufficient. Thus, the difference in gloss from the gloss control layer having higher gloss may be too small and the textured appearance may be insufficient. If the added amount is more than 40 parts by mass, the amount of the resin composition may be relatively insufficient for the amount of the gloss control agent. Therefore, the gloss control agent may be desorbed, or scratch resistance may be deteriorated due to the desorption, so that durability required of the decorative material 1 may be greatly impaired.

It should be noted that a gloss control agent may also be arbitrarily added to a gloss control layer having higher gloss. These additive amounts should be appropriately controlled depending on the final textured appearance or visual effects to be achieved. The gloss control agent and the resin composition may be the same or may be different between the first and second gloss control layers 5 and 6. They may be selected as desired according to the required textured appearance and other required properties.

[Other Additives]

Furthermore, in order to impart various functions, for example, functional additives, such as an antimicrobial agent and an antifungal agent, may be added to the first and second gloss control layers 5 and 6. An ultraviolet absorber or a light stabilizer may be added to the layers, if necessary.

For example, the ultraviolet absorber may be a benzotriazole-, benzoate-, benzophenone-, triazine- or cyanoacrylate-based ultraviolet absorber. For example, the light stabilizer may be a hindered amine-based light stabilizer.

<Base Material>

The base material 2 is not particularly limited, as long as it is usable as base paper for the decorative material 1. For example, known materials that can be used include paper, such as tissue paper, resin-mixed paper, titanium paper, resin-impregnated paper, flame-resistant paper, and inorganic paper; woven or non-woven fabrics made of natural fibers or synthetic fibers; synthetic resin-based base materials comprising homo- or random polypropylene resins, polyolefin resins such as polyethylene resin, copolymerized polyester resins, amorphous-state crystalline polyester resins, polyethylene naphthalate resins, polybutylene resins, acrylic resins, polyamide resins, polycarbonate resins, polyvinyl chloride resins, polyvinylidene chloride resins and fluororesins; wooden base materials, such as wood veneers, sliced veneers, plywood, laminate wood, particle boards and medium density fiberboards; inorganic base materials, such as gypsum plates, cement plates, calcium silicate plates and pottery plates; metal-based base materials, such as iron, copper, aluminum and stainless steel; and composite materials and laminates thereof. For example, the base material 2 may have a shape of a film, a sheet, a plate, a modified molded body, or the like.

<Patterned Ink Layer>

A patterned ink layer 4 for imparting a design pattern to the decorative material 1 may be formed between the base material 2 and the first gloss control layers 5. The design pattern may be, for example, of wood grain, stone, sand, tile, brick, fabric, grained leather, a geometric figure, or the like. In the example of FIG. 1, the patterned ink layer 4 is formed directly below the second gloss control layer 6. In other words, the second gloss control layer 6 is formed only in a portion overlapping the pattern ink layer 4. The design pattern of the patterned ink layer 4 is matched with the gloss of the second gloss control layer 6. As a result, the visual effects of the second gloss control layer 6 can be combined with the visual effects of the patterned ink layer 4. Therefore, a decorative material 1 that has a high-grade design expression close to natural wood or natural stone can be formed.

The present embodiment shows an example in which the second gloss control layer 6 is formed only in a portion overlapping the patterned ink layer 4, that is to say, formed only in a portion directly above the patterned ink layer 4. However, other configurations may also be used. For example, as long as the second gloss control layer 6 is formed in a portion overlapping the patterned ink layer 4 in plan view (as seen perpendicularly to the front surface), the second gloss control layer 6 may be formed in a portion other than the portion directly above the patterned ink layer 4.

<Base Solid Ink Layer>

According to the intended design, a base solid ink layer 3 may be provided between the base material 2 and the patterned ink layer 4. The base solid ink layer 3 is provided covering the entire first gloss control layer 5 side surface of the base material 2. If necessary, the base solid ink layer 3 may be a multilayer having two or more layers, to achieve a masking property or the like. Furthermore, the pattern ink layer 4 may be formed by laminating as many layers as necessary for expression of the desired design. Thus, the patterned ink layer 4 and the base ink layer 3 can be combined in various ways according to the required design, that is to say, the design to be expressed. However, the combinations are not particularly limited.

The material forming the base ink layer 3 and the patterned ink layer 4 is not particularly limited. For example, the material may be a printing ink or a coating agent in which a matrix and a colorant, such as a dye or a pigment, are dissolved and dispersed in a solvent. Examples of the matrix include various synthetic resins, such as oily nitrocellulose resin, two-component urethane resin, acrylic-based resin, styrene-based resin, polyester-based resin, urethane-based resin, polyvinyl-based resin, alkyd resin, epoxy-based resin, melamine-based resin, fluororesin, silicone-based resin, and rubber-based resin; mixtures thereof, copolymers thereof, and the like. Furthermore, examples of the colorant include inorganic pigments, such as carbon black, titanium white, zinc white, rouge, chrome yellow, Prussian blue and cadmium red; organic pigments, such as azo pigments, lake pigments, anthraquinone pigments, phthalocyanine pigments, isoindolinone pigments and dioxazine pigments; and mixtures thereof. Moreover, examples of the solvent include toluene, xylene, ethyl acetate, butyl acetate, methyl alcohol, ethyl alcohol, isopropyl alcohol, acetone, methyl ethyl ketone, methyl isobutyl ketone, cyclohexanone, water, and mixtures thereof.

Further, in order to impart various functions, for example, functional additives, such as an extender pigment, a plasticizer, a dispersant, a surfactant, a tackifier, an adhesion enhancer, a drying agent, a curing agent, a curing accelerator, and a curing retarder, may be added to the base ink layer 3 and the pattern ink layer 4.

The base solid ink layer 3, the patterned ink layer 4, and the first and second gloss control layers 5 and 6 may each be formed by various printing methods, such as gravure printing, offset printing, screen printing, electrostatic printing and ink-jet printing. Furthermore, because the base solid ink layer 3 and the first gloss control layer 5 cover the entire surface of the base material 2, they can also be formed by various coating methods, such as roll coating, knife coating, micro gravure coating and die coating. A method may be individually selected from these printing and coating methods for each layer, or the same method may be selected for all the layers to carry out collective processing.

In order to adjust the thickness of the first and second gloss control layers 5 and 6, the application amount may be controlled when performing the above printing method or coating method. In each printing method or coating method, the application amount can be calculated by producing a product in which a gloss control layer is formed on the base material 2, and a product in which a gloss control layer is not formed, and then calculating a mass difference.

<Transparent Resin Layer>

In particular, when abrasion resistance is required, a transparent resin layer (not shown) may be provided between the patterned ink layer 4 and the first gloss control layer 5. For example, a resin composition comprising an olefin-based resin as a main component may be preferably used as the transparent resin layer. Examples of the olefin-based resin include polypropylene, polyethylene and polybutene; as well as those obtained by homopolymerization or copolymerization of two or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene); and those obtained by copolymerization of ethylene or α-olefins with other monomers, such as an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer or ethylene-butyl acrylate copolymer. In particular, in order to further improve surface strength, highly crystalline polypropylene is preferably used.

For example, the transparent resin layer may contain additives, such as a heat stabilizer, an ultraviolet absorber, a light stabilizer, an antiblocking agent, a catalyst scavenger and a colorant. These additives may be suitably selected from known additives. The transparent resin layer can be formed, for example, by various lamination methods, such as a method applying heat and pressure, an extrusion lamination method and a dry lamination method.

Effects and Others (1) The decorative material 1 of the present embodiment includes a first gloss control layer 5, and a second gloss control layer 6 provided on part of the first gloss control layer 5. This configuration contributes to providing good visual effects.

In the decorative material 1 of the present embodiment, the design pattern of the patterned ink layer 4 is matched with the gloss of the second gloss control layer 6. Therefore, the visual effects of the second gloss control layer 6 can be combined with the visual effects of the patterned ink layer 4, so that a decorative material 1 that expresses a design with an air of luxury close to that of natural wood or natural stone can be formed.

(2) In the decorative material 1 of the present embodiment, the base-side first gloss control layer 5 contains a gloss control agent comprising a hydrophobic inorganic material, and a silicone-based release agent having a reactive terminal group.

In this case, the reactive terminal group of the silicone-based release agent may preferably have at least one of a hydroxyl group and an amino group.

According to this configuration, by using a hydrophobic gloss control agent and a silicone-based release agent, it is possible to suppress the adsorption of hydrophilic contaminants and permeation into the voids existing at the interface between the transparent resin and the matting agent. Therefore, an improved or even high contamination resistance can be exhibited. Furthermore, use of an inorganic material, such as silica, as a gloss control agent can exhibit an improved or even high transparency which can enhance visibility of the lower layer.

Consequently, there can be provided a decorative material 1 providing improved or even high visibility for the lower layer, improved or even high contamination resistance, and long-lasting stable release properties.

(3) The decorative material 1 of the present embodiment uses a gloss control agent which is composed of an inorganic material having a high matting effect. Therefore, the gloss of the gloss control layer to which the gloss control agent has been added can be greatly lowered. Accordingly, the difference in gloss between the first and second gloss control layers 5 and 6 can be increased, and a sufficiently textured appearance can be obtained. Thus, high-quality design expression having an appearance of greater depth can be achieved.

(4) In the decorative material 1 of the present embodiment, the resin component included in the first gloss control layer 5 is a mixture of a two-part urethane-based thermosetting resin and an ionizing radiation curable resin, the two-part urethane-based thermosetting resin being composed of at least one polyol and at least one isocyanate, the ionizing radiation curable resin having an acryloyl or a methacryloyl group. The mixing ratio, in this case, of the thermosetting resin is 3 parts by mass or more and 100 parts by mass or less relative to 100 parts by mass of the ionizing radiation curable resin.

According to this configuration, since the first gloss control layer 5 is a dually cured layer obtained through thermal curing and ionizing radiation curing, no defects are caused when laminating the second gloss control layer 6. Thus, a decorative layer 1 having improved or even high scratch resistance can be provided.

Modifications (1) As shown in FIG. 1, the present embodiment shows an example in which the second gloss control layer 6 is formed in a portion overlapping the patterned ink layer 4, and the design pattern of the patterned ink layer 4 matches with the gloss of the second gloss control layer 6. However, other configurations may also be used.

Figure 2:
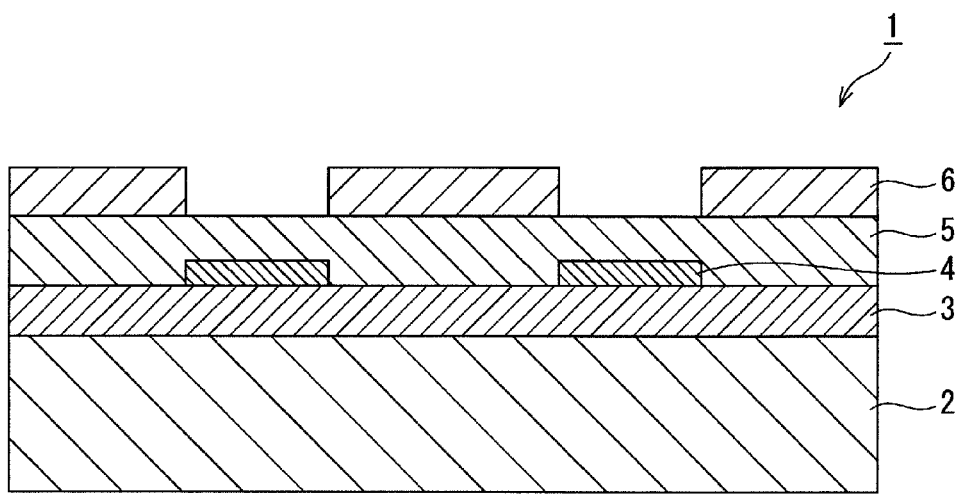
FIG. 2 is a cross-sectional view of a modification of the decorative material.

For example, as shown in FIG. 2, the second gloss control layer 6 may be formed in a portion other than the portion directly above the patterned ink layer 4, and the design pattern of the patterned ink layer 4 may be matched with the gloss of the first gloss control layer 5. As a result, the gloss of the exposed first gloss control layer 5 is imparted to the design pattern of the patterned ink layer 4, so that the visual effects of the gloss control layer 5 can be combined with the visual effects of the pattered ink layer 4. Therefore, a decorative material 1 which expresses a design with an air of luxury close to that of natural wood or natural stone can be formed.

(2) In the example provided above, the resin component included in the second gloss control layer 6 is a mixture of a urethane-based thermosetting resin and an ionizing radiation curable resin, the urethane-based thermosetting resin containing a polyol and an isocyanate, the ionizing radiation curable resin having an acryloyl group or a methacryloyl group. However, other configurations may be used.

For example, the resin component included in the second gloss control layer 6 may be only an ionizing radiation curable resin having an acryloyl group or a methacryloyl group. Thus, scratch resistance of the second gloss control layer 6 can be improved.

EXAMPLES

Specific examples of the decorative material 1 of the present embodiment will be described below.

Example 1

In Example 1, impregnated paper having a basis weight of 50 g/m$^2$ (GFR-506 manufactured by Kohjin Co., Ltd.) was used as a base material 2. On one surface of the base material 2, a base solid ink layer 3 and a patterned ink layer 4 were formed in this order using oily nitrocellulose resin gravure printing inks (various colors of PCNT (PCRNT) manufactured by Toyo Ink Co., Ltd.). The design pattern of the patterned ink layer 4 was a wood grain pattern.

Subsequently, an ink for a first gloss control layer 5 was applied across one surface of the base material 2, on which the patterned ink layer 4 had been formed, to thereby form a first gloss control layer 5. The ink was formulated by adding a two-part urethane-based thermosetting resin (25 parts by mass of total solid content) containing 54.8 parts by mass (20 parts by mass of solid content) of acrylic polyol (6KW-700 (36.5% solids) manufactured by Taisei Fine Chemical Co., Ltd.) and 6.9 parts by mass (5 parts by mass of solid content) of polyisocyanate (UR190B curing agent (72.5% solids) manufactured by Toyo Ink Co., Ltd.); 10 parts by mass (or more) (135 parts total solids) of a surface-treated silica-based gloss control agent (MIZUKASIL P-802-Y manufactured by Mizusawa Industrial Chemicals, Ltd.); 5 parts by mass of ultraviolet radical initiator (IRGACURE 184 manufactured by BASF); and 5.4 parts by mass (1.0 parts active component relative to total solids) of silicone-based release agent having a hydroxyl group (BYK-SILCLEAN 3700 (25% active component) manufactured by BYK), to 100 parts by mass (100 parts by mass of solid content) of an ionizing radiation curable resin (dipentaerythritol hexaacrylate (100% solids)). The application amount of the ink was 5 g/m$^2$.

Subsequently, an ink for a second gloss control layer 6 was applied to a part of the first gloss control layer 5 directly above the patterned ink layer 4 without applying ionizing radiation to the resin component (ionizing radiation curable resin) included in the first gloss control layer 5, thereby forming the second gloss control layer 6. The ink was formulated by adding 5 parts by mass (or more) (105 parts total solids) of a surface-treated silica-based gloss control agent (MIZUKASIL P-802Y manufactured by Mizusawa Industrial Chemicals, Ltd.); 5 parts by mass of ultraviolet radical initiator (IRGACURE 184 manufactured by BASF); and 1.3 parts by mass (0.5 parts active component relative to total solids) of silicone-based release agent having an acryloyl group (BYK-UV3505 (40% active component) manufactured by BYK), to 100 parts by mass (100 parts by mass of solid content) of an ionizing radiation curable resin (dipentaerythritol hexaacrylate (100% solids)).

Then, the decorative material 1 obtained in this manner was irradiated with ionizing radiation to crosslink and cure the ionizing radiation curable resin in the first and second gloss control layers 5 and 6. The decorative material of Example 1 was obtained following further heat curing.

Example 2

In Example 2, the ink for the first gloss control layer 5 was formulated so as to contain 10.8 parts by mass (2.0 parts active component relative to total solids) of silicone-based release agent having a hydroxyl group (BYK-SILCLEAN 3700 (25% active component) manufactured by BYK), and the ink for the second gloss control layer 6 was formulated so as to contain 5.3 parts by mass (2.0 parts active component relative to total solids) of silicone-based release agent having an acryloyl group (BYK-UV3505 (40% active component) manufactured by BYK). The remaining configuration was the same as that of Example 1. Thus, a decorative material of Example 2 was obtained.

Example 3

In Example 3, the ink for the second gloss control layer 6 was formulated by adding a two-part urethane-based thermosetting resin (25 parts by mass of total solid content) containing 54.8 parts by mass of acrylic polyol (6KW-700

(36.5% solids) manufactured by Taisei Fine Chemical Co., Ltd.) and 6.9 parts by mass of polyisocyanate (UR190B curing agent (72.5% solids) manufactured by Toyo Ink Co., Ltd.); 5 parts by mass (or more) (130 parts total solids) of a surface-treated silica-based gloss control agent (MIZUKA-SIL P-802Y manufactured by Mizusawa Industrial Chemicals, Ltd.); 5 parts by mass of ultraviolet radical initiator (IRGACURE 184 manufactured by BASF); and 6.5 parts by mass (2.0 parts active component relative to total solids) of silicone-based release agent having an acryloyl group (BYK-UV3505 (40% active component) manufactured by BYK), to 100 parts by mass (100 parts by mass of solid content) of an ionizing radiation curable resin (dipentaerythritol hexaacrylate (100% solids)). The remaining configuration was the same as that of Example 2. Thus, a decorative material of Example 3 was obtained.

Example 4

In Example 4, the ink for the first gloss control layer 5 was formulated so as to contain 27.0 parts by mass (5.0 parts active component relative to total solids) of silicone-based release agent having a hydroxyl group (BYK-SILCLEAN 3700 (25% active component) manufactured by BYK), and the ink for the second gloss control layer 6 was formulated so as to contain 11.8 parts by mass (4.5 parts active component relative to total solids) of silicone-based release agent having an acryloyl group (BYK-UV3505 (40% active component) manufactured by BYK). The remaining configuration was the same as that of Example 1. Thus, a decorative material of Example 4 was obtained.

Example 5

In Example 5, the ink for the first gloss control layer 5 was formulated so as to contain 4.3 parts by mass (0.8 parts active component relative to total solids) of silicone-based release agent having a hydroxyl group (BYK-SILCLEAN 3700 (25% active component) manufactured by BYK), and the ink for the second gloss control layer 6 was formulated so as to contain 0.8 parts by mass (0.3 parts active component relative to total solids) of silicone-based release agent having an acryloyl group (BYK-UV3505 (40% active component) manufactured by BYK). The remaining configuration was the same as that of Example 1. Thus, a decorative material of Example 5 was obtained.

Example 6

In Example 6, the ink for the first gloss control layer 5 was formulated so as to contain 35.1 parts by mass (6.5 parts active component relative to total solids) of silicone-based release agent having a hydroxyl group (BYK-SILCLEAN 3700 (25% active component) manufactured by BYK), and the ink for the second gloss control layer 6 was formulated so as to contain 14.5 parts by mass (5.5 parts active component relative to total solids) of silicone-based release agent having an acryloyl group (BYK-UV3505 (40% active component) manufactured by BYK). The remaining configuration was the same as that of Example 1. Thus, a decorative material of Example 6 was obtained.

Comparative Example 1

In Comparative Example 1, the ink for the first gloss control layer 5 was formulated so as to contain 10 parts by mass of a silica-based gloss control agent (MIZUKASIL P-803 manufactured by Mizusawa Industrial Chemicals, Ltd.) which had not been subjected to surface treatment. The remaining configuration was the same as that of Example 2. Thus, a decorative material of Comparative Example 1 was obtained.

Comparative Example 2

In Comparative Example 2, the ink for the first gloss control layer 5 was formulated so as to contain 10 parts by mass of a surface-treated silica-based gloss control agent prepared as described below. The remaining configuration was the same as that of Example 2. Thus, a decorative material of Comparative Example 2 was obtained.

Here, 100 parts by mass of a silica-based gloss control agent (MIZUKASIL P-803 manufactured by Mizusawa Industrial Chemicals, Ltd.) which had not been subjected to surface treatment was placed in a Henschel mixer. Then, 20 parts by mass of a mixture containing 72 parts by mass of ethanol, 8 parts by mass of water, and 20 parts by mass of methyltrimethoxysilane (KBM-13 manufactured by Shin-Etsu Chemical Co., Ltd) was gradually added dropwise to the Henschel mixer with stirring. After the dropwise addition, stirring was continued for another 30 minutes to obtain the surface-treated silica-based gloss control agent used in Comparative Example 2.

Comparative Example 3

In Comparative Example 3, the ink for the first gloss control layer 5 was formulated so as to contain 2.6 parts by mass (1.0 parts active component relative to total solids) of non-reactive silicone-based release agent (BYK-330 (51% active component) manufactured by BYK), and the ink for the second gloss control layer 6 was formulated so as to contain 1.0 part by mass (0.5 parts active component relative to total solids) of non-reactive silicone-based release agent (BYK-330 (51% active component) manufactured by BYK). The remaining configuration was the same as that of Example 1. Thus, a decorative material of Comparative Example 3 was obtained.

Comparative Example 4

In Comparative Example 4, the ink for the first gloss control layer 5 was formulated so as to contain 5.3 parts by mass (2.0 parts active component relative to total solids) of non-reactive silicone-based release agent (BYK-330 (51% active component) manufactured by BYK), and the ink for the second gloss control layer 6 was formulated so as to contain 4.1 part by mass (2.0 parts active component relative to total solids) of non-reactive silicone-based release agent (BYK-330 (51% active component) manufactured by BYK). The remaining configuration was the same as that of Example 1. Thus, a decorative material of Comparative Example 4 was obtained.

Comparative Example 5

In Comparative Example 5, the ink for the first gloss control layer 5 was formulated so as to contain 13.2 parts by mass (5.0 parts active component relative to total solids) of non-reactive silicone-based release agent (BYK-330 (51% active component) manufactured by BYK), and the ink for the second gloss control layer 6 was formulated so as to contain 9.3 part by mass (4.5 parts active component relative to total solids) of non-reactive silicone-based release agent (BYK-330 (51% active component) manufactured by BYK). The remaining configuration was the same as that of Example 1. Thus, a decorative material of Comparative Example 5 was obtained.

The following evaluations based on the evaluation method described above were performed with respect to the gloss control agents used in the first gloss control layer 5 of Examples 1 to 6 and Comparative Examples 1 to 5 above, and the mass loss ratio (MB/MA) due to the heating in each evaluation was calculated. The results are presented in Table 1.

Evaluation Method A

In accordance with JIS K5101,23 the target inorganic material was left standing under a 110° C. environment for 2 hours, and then the mass decrease was measured.

Evaluation Method B

Using the same conditions as evaluation method A except for the environment temperature, the inorganic material is left standing under a 950° C. environment for 2 hours, and then a decrease in the mass of the inorganic material is measured.

Evaluation

Examples 1 to 6 and Comparative Examples 1 to 5 described above were evaluated in terms of their contamination resistance, release properties and scratch resistance.

<Contamination Resistance>

The evaluation was performed according to the JIS contamination A test. Specifically, a 10-mm line was drawn on the surface of the obtained decorative material with blue ink serving as a hydrophilic contaminant, and red crayon serving as a hydrophobic contaminant. After being left standing for 4 hours, the lines were wiped off using a cloth or the like containing a solvent or a detergent.

Then, the color residue on the surface of the test piece was examined.

The evaluation criteria were as follows. In practice, there is no problem (the passing criteria are met) when the evaluation is "Δ" or higher.

⊚: No color residue observed
○: Slight color residue observed
Δ: Noticeable color residue observed
x: Severe color residue observed <Release Properties (Long Period)>

Sellotape (registered trademark) (24 mm, manufactured by Nichiban Co., Ltd.) was attached to each specimen and sufficiently uniformly pressed against the specimen. Then the specimens were left under an environment of 60° C. for 4 days. After being taken out and cooled down to room temperature, the tape of each specimen was rapidly torn off at an angle of 90°. In practice, there is no problem (the passing criteria are met) when the evaluation is "Δ".

The evaluation criteria were as follows.

○: Detachment did not occur between paper sheets or between layers
Δ: Partial detachment occurred
x: Complete detachment occurred <Scratch Resistance>

The obtained decorative materials were each subjected to a 10-reciprocation scratch resistance test using steel wool (#0000) with a load of 500 g/cm$^2$. Then, each specimen was visually examined in terms of the presence of scratches or change in glossiness.

The evaluation criteria were as follows. In practice, there is no problem (the passing criteria are met) when the evaluation is "Δ" or higher.

⊚: No change in glossiness
○: Slight change in glossiness
Δ: Scratches not visible, but clear change in glossiness
x: Scratches or large change in glossiness The evaluation results are presented in Table 1.

TABLE 1

| Items | First gloss control layer | | | Release agent | | Second gloss control layer | |
|---|---|---|---|---|---|---|---|
| | Ionizing radiation curable resin (solid content) | Urethane-based thermosetting resin (solid content) | Gloss control agent evaluation method ratio (MB/MA) | Reactivity | Active component (relative to 100 parts by mass of total solids) | Ionizing radiation curable resin (solid content) | Urethane-based thermosetting resin (solid content) |
| Example 1 | 100 parts by mass | 25 parts by mass | 4.0 | Yes (Hydroxyl group) | 1.0 parts | 100 parts by mass | 0 parts by mass |
| Example 2 | 100 parts by mass | 25 parts by mass | 4.0 | Yes (Hydroxyl group) | 2.0 parts | 100 parts by mass | 0 parts by mass |
| Example 3 | 100 parts by mass | 25 parts by mass | 4.0 | Yes (Hydroxyl group) | 2.0 parts | 100 parts by mass | 25 parts by mass |
| Example 4 | 100 parts by mass | 25 parts by mass | 4.0 | Yes (Hydroxyl group) | 5.0 parts | 100 parts by mass | 0 parts by mass |
| Example 5 | 100 parts by mass | 25 parts by mass | 4.0 | Yes (Hydroxyl group) | 0.8 parts | 100 parts by mass | 0 parts by mass |
| Example 6 | 100 parts by mass | 25 parts by mass | 4.0 | Yes (Hydroxyl group) | 6.5 parts | 100 parts by mass | 0 parts by mass |
| Comparative Example 1 | 100 parts by mass | 25 parts by mass | 0.8 | Yes (Hydroxyl group) | 2.0 parts | 100 parts by mass | 0 parts by mass |

TABLE 1-continued

| | | | | | | | |
|---|---|---|---|---|---|---|---|
| Comparative Example 2 | 100 parts by mass | 25 parts by mass | 11.2 | Yes (Hydroxyl group) | 2.0 parts | 100 parts by mass | 0 parts by mass |
| Comparative Example 3 | 100 parts by mass | 25 parts by mass | 4.0 | No | 1.0 parts | 100 parts by mass | 0 parts by mass |
| Comparative Example 4 | 100 parts by mass | 25 parts by mass | 4.0 | No | 2.0 parts | 100 parts by mass | 0 parts by mass |
| Comparative Example 5 | 100 parts by mass | 25 parts by mass | 4.0 | No | 5.0 parts | 100 parts by mass | 0 parts by mass |

| | Second gloss control layer Release agent | | Contamination resistance | | | |
|---|---|---|---|---|---|---|
| Items | Reactivity | Active component (relative to 100 parts by mass of total solids) | Hydrophilicity Water-based ink | Hydrophobicity Crayon (red) | Release properties Long term | Scratch resistance |
| Example 1 | Yes (Acryloyl group) | 0.5 parts | ○ | ○ | ○ | ◎ |
| Example 2 | Yes (Acryloyl group) | 2.0 parts | ○ | ◎ | ○ | ◎ |
| Example 3 | Yes (Acryloyl group) | 2.0 parts | ○ | ◎ | ○ | ○ |
| Example 4 | Yes (Acryloyl group) | 4.5 parts | ◎ | ◎ | ○ | ○ |
| Example 5 | Yes (Acryloyl group) | 0.3 parts | Δ | Δ | Δ | ◎ |
| Example 6 | Yes (Acryloyl group) | 5.5 parts | ◎ | ◎ | ○ | Δ |
| Comparative Example 1 | Yes (Acryloyl group) | 2.0 parts | X | ○ | ○ | ◎ |
| Comparative Example 2 | Yes (Acryloyl group) | 2.0 parts | Δ | ○ | X | Δ |
| Comparative Example 3 | No | 0.5 parts | ○ | ○ | X | Δ |
| Comparative Example 4 | No | 2.0 parts | ○ | ◎ | X | ○ |
| Comparative Example 5 | No | 4.5 parts | ◎ | ◎ | X | ○ |

As will be understood from Table 1, contamination resistance with respect to hydrophilic contaminants, release properties and scratch resistance are all satisfied in the decorative materials 1 of Examples 1 to 6. On the other hand, contamination resistance with respect to hydrophilic contaminants has deteriorated in Comparative Example 1. This is thought to be because the surface of the gloss control agent is hydrophilic, which causes adsorption of the hydrophilic contaminant materials, and permeation into the voids which exist at the interface between the transparent resin and the gloss control agent.

Furthermore, in Comparative Example 2, the amount of the surface treatment agent applied to the gloss control agent was excessive. This caused the surface of the gloss control layer to bleed out, and the long-term release properties to deteriorate. In addition, in Comparative Examples 3 to 5 where a non-reactive release agent was used, the evaluation was poor only in terms of long-term release properties. This is considered to be because there is no reactivity at all between the release agent and the resin and this caused the release agent to bleed out of the gloss control layer during the time it was kept at 60° C. without being fixed inside the layer, and has caused deterioration in release properties.

As can be seen from the above evaluations, it is apparent that the decorative materials of Examples 1 to 6 provide decorative materials 1 in which contamination resistance, release properties and scratch resistance are all satisfied.

The decorative material 1 of the present invention is not limited to the above embodiments and examples, but various modifications may be made within the range not impairing the features of the invention.

REFERENCE SIGNS LIST

1 Decorative material; 2 Base material; 3; Base solid ink layer; 4 Patterned ink layer; 5 First gloss control layer; 6 Second gloss control layer.

What is claimed is:

1. A decorative material, comprising:
   a first gloss control layer provided as a surface layer; and
   a second gloss control layer provided on part of the first gloss control layer; wherein
   the first gloss control layer includes a gloss control agent composed of a hydrophobic inorganic material and a silicone-based release agent having a reactive terminal group, and the hydrophobic inorganic material is an inorganic material that satisfies the following formula (1), 1.2<(MB/MA)<10.0 ... (1), where MA represents a decrease in a mass of the inorganic material and is measured using an Evaluation Method A below, and MB represents a decrease in a mass of the inorganic material and is measured using an Evaluation Method B below, with the mass of the inorganic material in the Evaluation Method A and the mass of the inorganic material in the Evaluation Method B being the same as each other; wherein, (Evaluation Method A): the inorganic material is left standing under a 110° C. environment for 2 hours, and then a decrease in the mass of the inorganic material is measured; and, (Evaluation Method B): using the same conditions as the Evaluation Method A except for the environment temperature, the inorganic material is left standing under a 950° C. environment for 2 hours, and then a decrease in the mass of the inorganic material is measured.

2. The decorative material of claim 1, wherein the reactive terminal group of the silicone-based release agent has at least one of a hydroxyl group and an amino group.

3. The decorative material of claim 1, wherein an added amount of the silicone-based release agent in the first gloss control layer is an amount such that an active component of the silicone-based release agent is 1 part by mass or more and 6 parts by mass or less relative to 100 parts by mass of solid content included in the first gloss control layer.

4. The decorative material of claim 1, wherein a resin component included in the first gloss control layer contains a main material that is a mixture of a urethane-based thermosetting resin and an ionizing radiation curable resin, the urethane-based thermosetting resin containing a polyol and an isocyanate, the ionizing radiation curable resin having an acryloyl group or a methacryloyl group; and a content of the urethane-based thermosetting resin is 3 parts by mass or more and 100 parts by mass or less relative to 100 parts by mass of the ionizing radiation curable resin.

5. The decorative material of claim 1, wherein the second gloss control layer contains a silicone-based release agent having a reactive terminal group; and the reactive terminal group of the silicone-based release agent has at least one of an acryloyl group and a methacryloyl group.

6. The decorative material of claim 5, wherein an added amount of the silicone-based release agent in the second gloss control layer is an amount such that an active component of the silicone-based release agent is 0.5 parts by mass or more and 5 parts by mass or less relative to 100 parts by mass of solid content included in the second gloss control layer.

7. The decorative material of claim 1, wherein a resin component included in the second gloss control layer contains a main material that is a mixture of a urethane-based thermosetting resin and an ionizing radiation curable resin, the urethane-based thermosetting resin containing a polyol and an isocyanate, the ionizing radiation curable resin having an acryloyl group or a methacryloyl group; and a content of the urethane-based thermosetting resin is 25 parts by mass or less relative to 100 parts by mass of the ionizing radiation curable resin.

8. The decorative material of claim 1, wherein a resin component included in the second gloss control layer has a main material that is an ionizing radiation curable resin having an acryloyl group or a methacryloyl group.

9. The decorative material of claim 1, further comprising a patterned ink layer under the first gloss control layer; wherein the second gloss control layer is formed in a portion overlapping a design pattern of the patterned ink layer as viewed perpendicularly to the surface layer, and the design pattern of the patterned ink layer is matched with gloss of the second gloss control layer.

10. The decorative material of claim 1, further comprising a patterned ink layer under the first gloss control layer; wherein the second gloss control layer is formed on a portion other than directly above the design pattern of the patterned ink layer, and the design pattern of the patterned ink layer is matched with gloss of the second gloss control layer.

11. The decorative material of claim 1, wherein the reactive terminal group of the silicone-based release agent has a hydroxyl group.

* * * * *